United States Patent [19]
Miyauch et al.

[11] Patent Number: 5,347,760
[45] Date of Patent: Sep. 20, 1994

[54] GEAR FINISHING APPARATUS

[75] Inventors: Masaaki Miyauch; Makoto Kawano; Takashi Kitamura; Hiromu Okunishi; Fumio Haga, all of Saitama, Japan

[73] Assignee: Honda Giken Kogyo Kabushiki Kaisha, Tokyo, Japan

[21] Appl. No.: 183,624

[22] Filed: Jan. 19, 1994

Related U.S. Application Data

[63] Continuation of Ser. No. 115,714, Sep. 3, 1993, abandoned.

[30] Foreign Application Priority Data

Sep. 4, 1992 [JP] Japan .................. 4-311454
Oct. 27, 1992 [JP] Japan .................. 4-262998

[51] Int. Cl.$^5$ ........................... B24B 5/36
[52] U.S. Cl. ........................... 451/114; 451/47
[58] Field of Search ............... 51/73 R, 26, 287, 5 D, 51/325

[56] References Cited

U.S. PATENT DOCUMENTS

| | | | |
|---|---|---|---|
| 1,693,781 | 12/1928 | Hanson | 51/52 HB |
| 1,924,736 | 8/1933 | Fehr | 51/26 |
| 1,985,213 | 12/1934 | Page | 51/26 |
| 2,069,324 | 2/1937 | Miller | 51/73 R |
| 2,108,547 | 2/1938 | Nyland | 51/26 |
| 2,186,304 | 1/1940 | Nyland | 51/26 |
| 2,257,195 | 9/1941 | Rovick | 51/26 |
| 3,550,330 | 12/1970 | Nakamura | 51/287 |

FOREIGN PATENT DOCUMENTS

| | | |
|---|---|---|
| 2719524 | 12/1977 | Fed. Rep. of Germany ........ 51/287 |
| 2814676 | 10/1979 | Fed. Rep. of Germany . |
| 2-284819 | 11/1990 | Japan . |
| 3-202225 | 9/1991 | Japan . |

*Primary Examiner*—Robert A. Rose
*Attorney, Agent, or Firm*—Armstrong, Westerman, Hattori, McLeland & Naughton

[57] ABSTRACT

A gear finishing apparatus includes a bed having a horizontally extending guide member and a vertically extending guide member, a grinding wheel support unit movable along the horizontally extending guide member and having a grinding wheel unit, a ring-shaped grinding wheel in the form of an internal gear rotatably supported on the grinding wheel head for rotation about a substantially vertical axis, a first actuator for moving the grinding wheel support unit along the horizontally extending guide member, a workpiece support unit movable along the vertically extending guide member, the workpiece support unit having a holding device for holding a gear blank having external gear teeth for rotation about a substantially vertical axis, a second actuator for moving the workpiece support unit along the vertically extending guide member to move the gear blank into and out of the grinding wheel, and a third actuator for rotating the grinding wheel to hone the gear teeth of the gear blank while the gear blank is being positioned in the grinding wheel held by the holding device, and the grinding wheel and the gear blank are being held in mesh with each other by the first actuator and the second actuator.

14 Claims, 12 Drawing Sheets

GEAR FINISHING APPARATUS

This application is a continuation of application Ser. No. 08/115,714 filed Sep. 3, 1993, now abandoned.

BACKGROUND OF THE INVENTION

1. Field of the Invention

The present invention relates to a gear finishing apparatus for honing a gear blank having gear teeth to finish the gear teeth.

2. Description of the Prior Art

Automotive transmissions and differentials, for example, have a number of gears that are required to be finished highly accurately, i.e., to very close dimensional tolerance. Such gears are manufactured by cutting gear teeth in a gear blank with a hobbing machine, for example, finishing the gear teeth with a gear shaving machine or the like, and then honing the gear teeth to a highly accurate finish that is desired.

Figure 13:
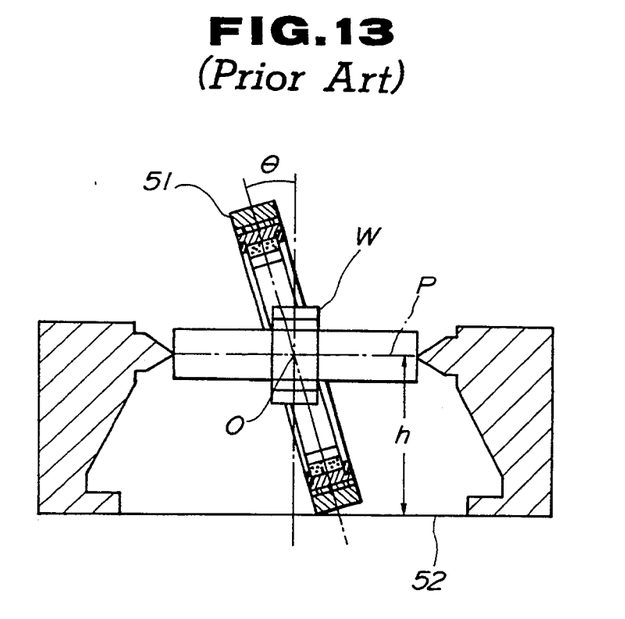
FIG. 13 is an elevational view of a conventional gear finishing apparatus.

One known honing apparatus is disclosed in Japanese laid-open patent publication No. 2-284819 or No. 3-202225, for example. As shown in FIG. 13 of the accompanying drawings, the disclosed honing apparatus has a workpiece support shaft whose axis P extends horizontally, with a gear blank W being rotatably supported on the workpiece support shaft, and a grinding wheel 51 in the form of an internal gear having gear teeth complementary in shape to the gear teeth and held in mesh with the gear blank W to be finished for finishing the gear teeth of the gear blank W. In order to finish the gear teeth of the gear blank W, the grinding wheel 51 is rotated with its rotational plane being tilted at an angle $\theta$ to the vertical plane.

The grinding wheel 51 is employed because the internal gear configuration thereof achieves a high contact interval for better finishing efficiency. The axis of the grinding wheel 51 is tilted at the angle $\theta$ to the vertical plane in order to give slippage along the gear teeth for a higher honing effect.

However, since the axis P of the workpiece support shaft which supports the gear blank W extends horizontally, and the grinding wheel 51 is tilted at the angle $\theta$ to the vertical plane, it is necessary to provide increased bearing rigidity for bearing the reactive forces that are produced when the gear blank W is machined, and such increased bearing rigidity results in an increase in the size of the honing apparatus.

More specifically, as shown in FIG. 13, in order to tilt the grinding wheel 51 at the angle $\theta$ to the vertical plane, the grinding wheel 51 is required to be angularly displaced about a horizontal axis that passes through the center O of the gear blank W perpendicularly to the sheet of FIG. 13, and the grinding wheel 51 and the gear blank W are required to mesh with each other at a meshing point that is as high as the center O. The distance h from a base 52 of the honing apparatus to the axis P of the workpiece support shaft has to be equal to at least the radius of the grinding wheel 51. Because of this large distance P, the bearing rigidity for bearing the reactive forces produced when the gear blank W is machined must be of a large setting, and the vertical dimension of the honing apparatus must be relatively large. The horizontally extending workpiece support shaft results in an increase in the width of the honing apparatus.

Other problems with the conventional honing apparatus are that it is very cumbersome to install the gear blank W on and remove the gear blank W from the workpiece support shaft, and chips produced when the gear blank W is cut fall onto the base 52, which tend to be deformed or damaged due to the heat carried by the chips and stored in the base 52. Any deformation or damage of the base 52 is detrimental to the accuracy, such as dimensional accuracy, of the finished gear.

SUMMARY OF THE INVENTION

It is therefore an object of the present invention to provide a gear finishing apparatus which is of a compact arrangement having increased bearing rigidity for bearing grinding wheel without a reduction in the machining accuracy, and can efficiently retrieve grinding oil including chips for circulatory use.

According to the present invention, there is provided a gear finishing apparatus comprising a bed having a horizontally extending guide member and a vertically extending guide member, a grinding wheel support unit movable along the horizontally extending guide member and having a grinding wheel unit, a ring-shaped grinding wheel in the form of an internal gear rotatably supported on the grinding wheel head for rotation about a substantially vertical axis, first actuating means for moving the grinding wheel support unit along the horizontally extending guide member, a workpiece support unit movable along the vertically extending guide member, the workpiece support unit having holding means for holding a gear blank having external gear teeth for rotation about a substantially vertical axis, second actuating means for moving the workpiece support unit along the vertically extending guide member to move the gear blank into and out of the grinding wheel, and third actuating means for rotating the grinding wheel to hone the gear teeth of the gear blank while the gear blank is being positioned in the grinding wheel held by the holding means, and the grinding wheel and the gear blank are being held in mesh with each other by the first actuating means and the second actuating means.

The grinding wheel support unit may have turning means for turning the grinding wheel head about a horizontal axis and securing the grinding wheel head after it has been turned in order to tilt the grinding wheel at a predetermined angle. The grinding wheel head may be angularly movably supported on the turning means either in a cantilevered fashion at one point on an extension of the horizontal axis or at two points on the extension of the horizontal axis.

The bed may comprise a rectangular parallelepiped having an upper surface and a side surface, and the workpiece support unit may be mounted on the side surface, so that the grinding wheel and the gear blank mesh with each other at a meshing point that is not positioned above the upper surface of the bed, thus preventing grinding oil from falling onto the upper surface of the bed while the gear blank is being honed. Alternatively, the bed may comprise an upper surface and have a vertical hole, and the workpiece support unit may be disposed in the vertical hole.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

A gear finishing apparatus according to a first embodiment of the present invention will be described below with reference to FIGS. 1 through 6.

Figure 1:
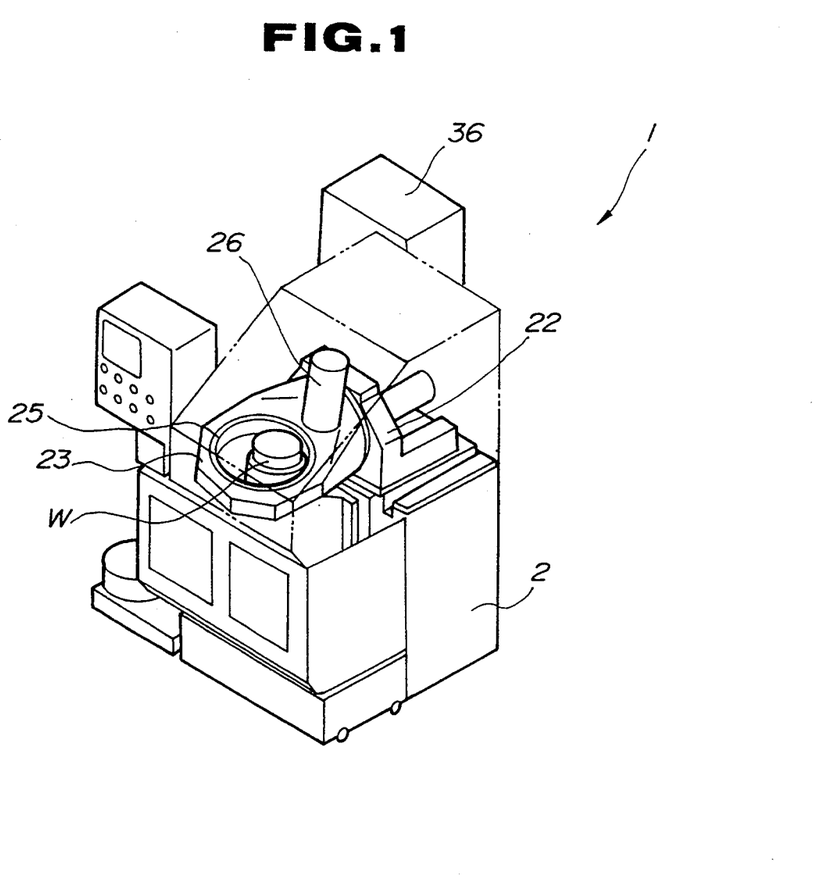
FIG. 1 is a perspective view of a gear finishing apparatus according to a first embodiment of the present invention.

As shown in FIG. 1, the gear finishing apparatus, generally designated by the reference numeral 1, has a bed 2 in the shape of a rectangular parallelepiped as a supporting base and includes a workpiece support shaft having a vertical axis and a grinding wheel in the form of an internal gear rotatable about an axis that extends perpendicularly across a plane which is slightly tilted from a horizontal plane.

A pair of spaced vertical guide rails 3 (see FIGS. 2 and 3) is mounted on a front side of the bed 2, and a workpiece support unit 4 is vertically movably supported on the guide rails 3.

The workpiece support unit 4 comprises a unit body 6 having a central spindle 5, a workpiece holder 7 counted on an upper portion of the spindle 5, and a workpiece index motor 8 coupled to a lower portion of the spindle 5. The workpiece support unit 4 also has a plurality of sliders 9 mounted on a rear side of the unit body 6 and slidably engaging the guide rails 3.

Figure 3:
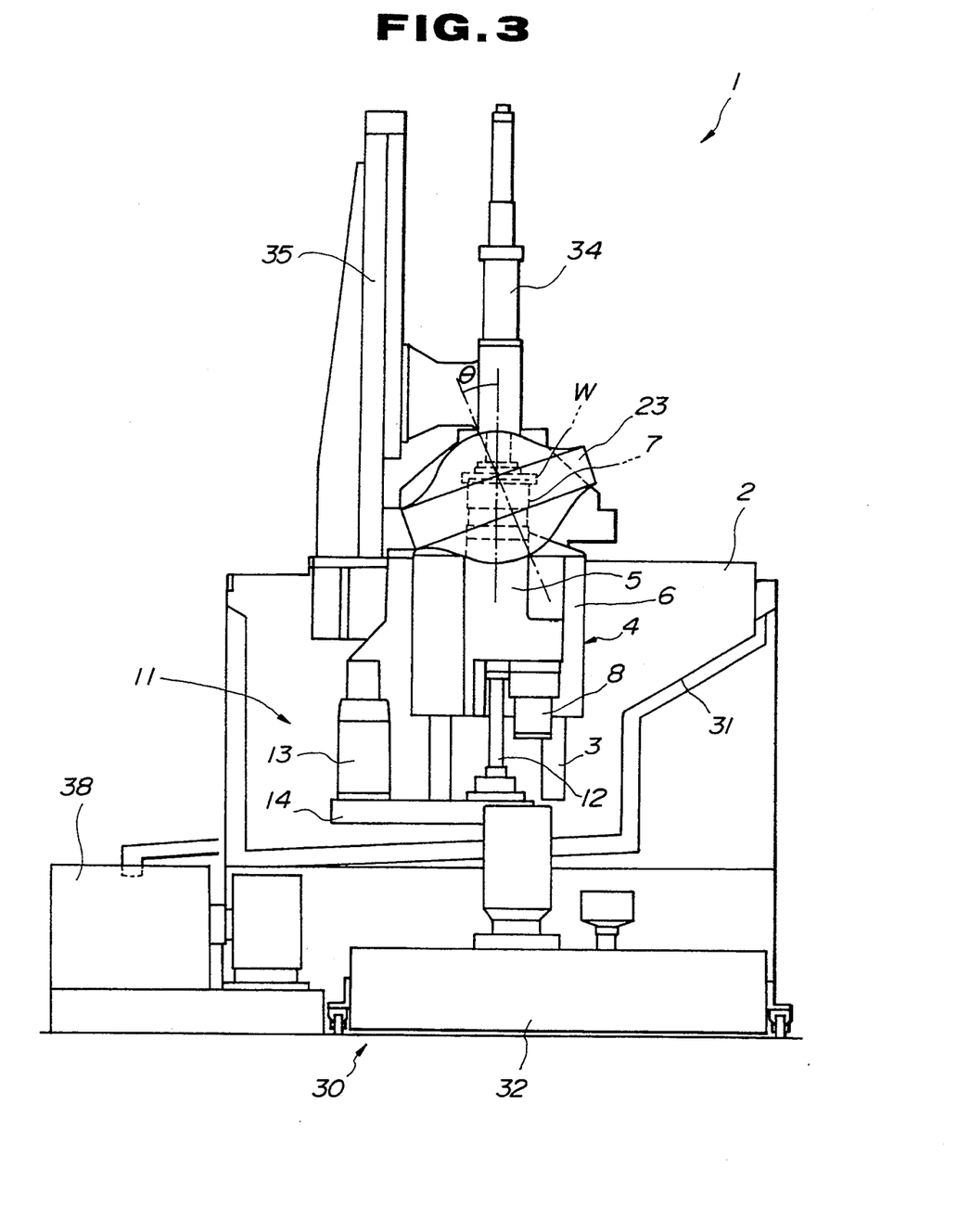
FIG. 3 is a front elevational view of the gear finishing apparatus shown in FIG. 1.

An actuator 11 for vertically moving the workpiece support unit 4 is fixed to the bed 2 below the unit body 6. As shown in FIG. 3, the actuator 11 comprises a motor 13, a vertical ball screw shaft 12 engaging a lower threaded portion of the unit body 6, and a transmission mechanism 14 for transmitting rotation from the motor 13 to the ball screw shaft 12. Therefore, when the ball screw shaft 12 is rotated about its own axis by the motor 13, the workpiece support unit 4 is vertically moved along the guide rails 3.

A gear blank W to be finished by the gear finishing apparatus is detachably supported on the upper end of the workpiece holder 7. The gear blank W is adjusted in phase, i.e., angularly indexed into a desired position, by the workpiece index motor 8 when it is to mesh with a grinding wheel 25 (described later on).

Figure 2:
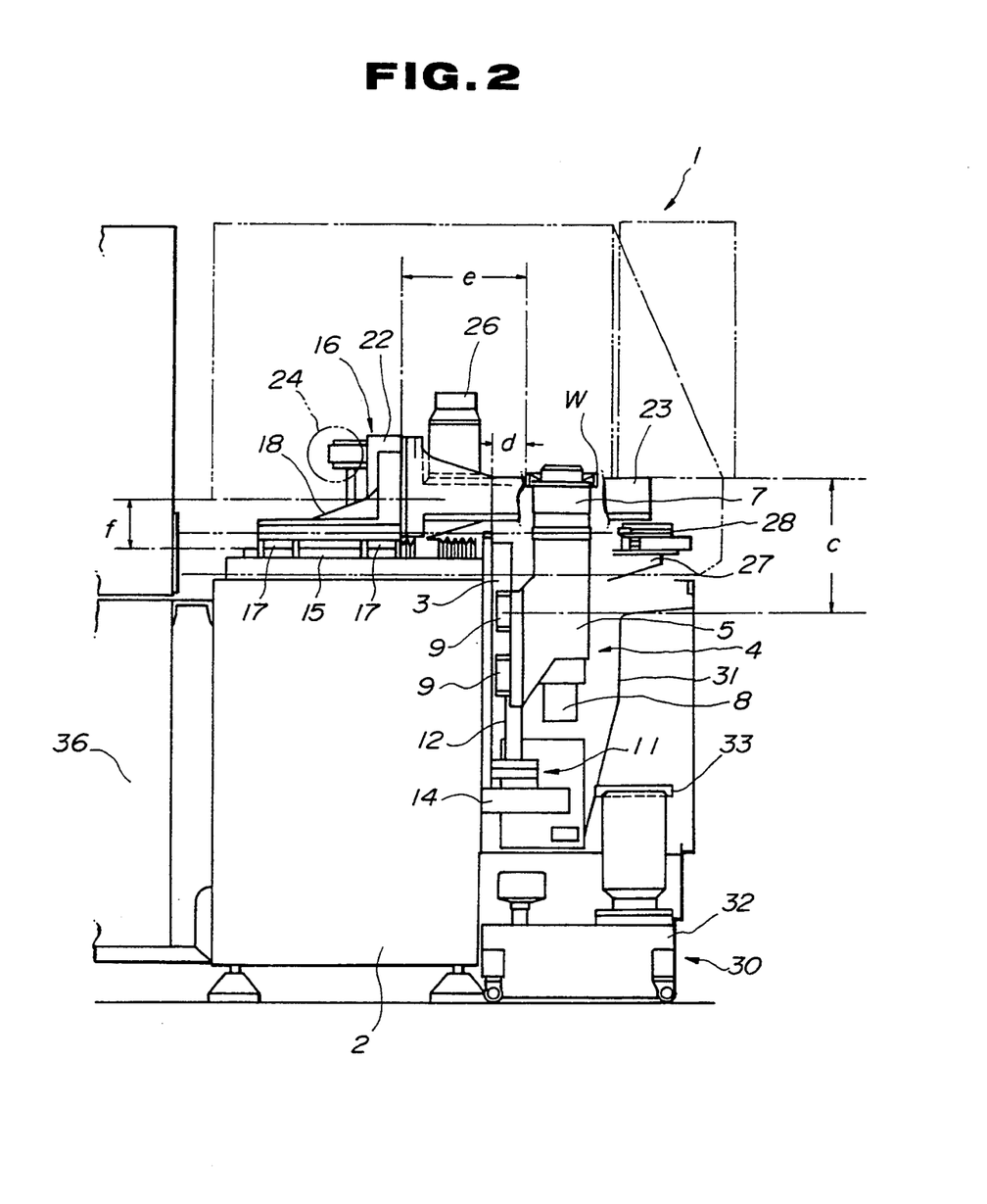
FIG. 2 is a side elevational view of the gear finishing apparatus shown in FIG. 1.

As shown in FIG. 2, a workpiece index unit 28 is mounted on a bracket 27 projecting laterally from the bed 2 for indexing the gear blank W.

The workpiece holder 7, which is detachably mounted on the upper portion of the spindle 5, can be replaced with another workpiece holder, if necessary, depending on the type of a gear blank to be finished.

Figure 4:
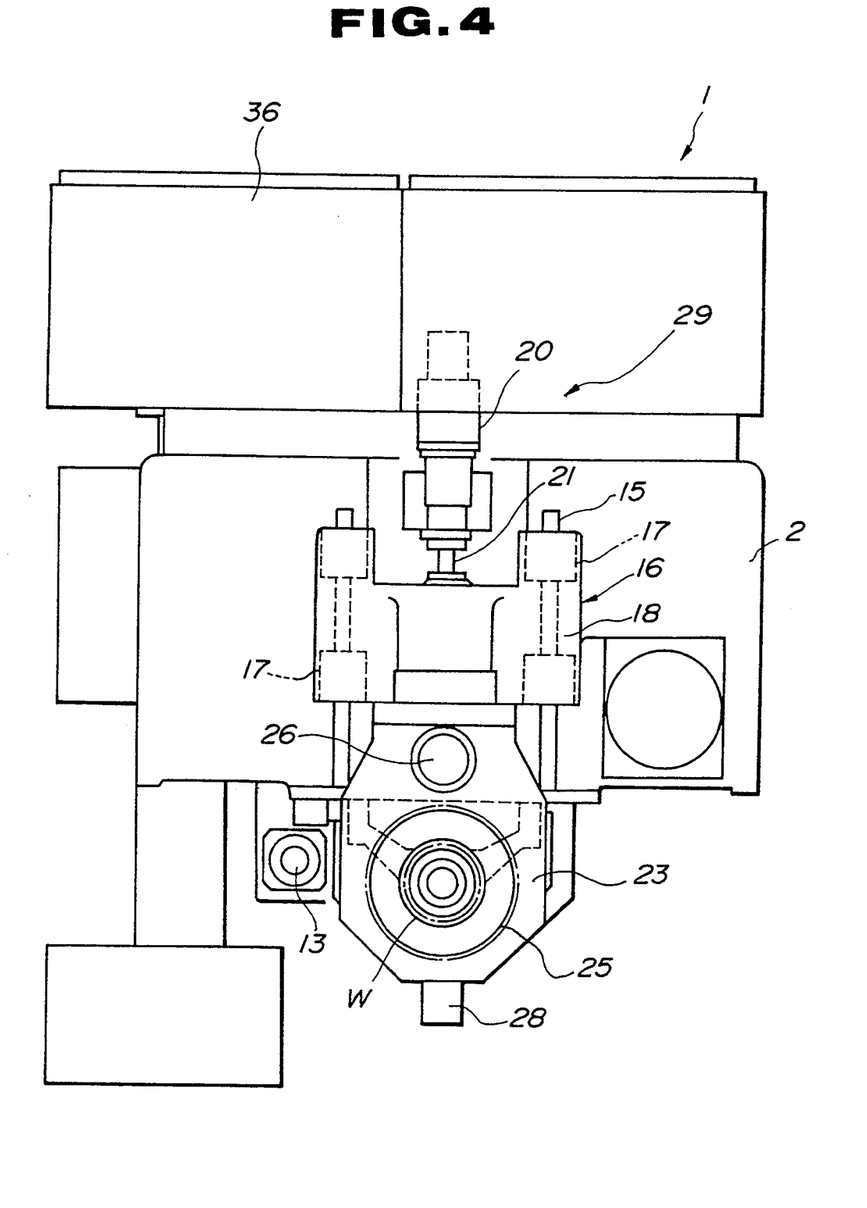
FIG. 4 is a plan view of the gear finishing apparatus shown in FIG. 1.

The bed 2 supports on its upper surface a pair of spaced linear guide rails 15 (see FIGS. 2 and 4). The guide rails 15 extend in a direction across the direction in which the guide rails 3 extend. A grinding wheel support unit 16 is movably supported on the guide rails 15.

The grinding wheel support unit 16 comprises a unit body 18, a plurality of sliders 17 attached to a lower surface of the unit body 18 and slidably engaging the guide rails 15, and a turn base 22 and a grinding wheel head 23 (described later on). Behind the grinding wheel support unit 16, there is disposed an actuator 29 (see FIG. 4) for moving the grinding wheel support unit 16 back and forth along the guide rails 15. The actuator 29 comprises a motor 20 and a horizontal ball screw shaft 21 coupled to the motor 20 and engaging in a rear threaded portion of the unit body 18. When the ball screw shaft 21 is rotated about its own axis by the motor 20, the grinding wheel support unit 16 is moved back and forth along the guide rails 15.

As shown in FIG. 2, the turn base 22 with an angle changing handle 24 coupled thereto is mounted on a front end of the unit body 18. The grinding wheel head 23 projects forwards from the turn base 22 and is coupled thereto for swinging movement about an axis (not shown) that extends horizontally from the turn base 22. The turn base 22 serves to adjust an angle $\theta$ through which the axis through which the grinding wheel 25 is rotatable is inclined from the axis through which the gear blank W is rotatable, i.e., from the vertical axis. The angle $\theta$ can be adjusted by turning the grinding wheel head 23 coupled to the turn base 22 with the angle changing handle 24 through a desired angle.

The grinding wheel head 23 has a circular hole defined in a front portion thereof, and the grinding wheel 25, which is in the form of a ring-shaped internal gear, is rotatably supported on the inner circumferential surface of the circular hole. The grinding wheel 25 can be rotated by a motor 26 mounted on an end of the grinding wheel head 23 close to the turn table 22. Rotation of the motor 26 may be transmitted to the grinding wheel 25 by intermeshing gears or the like.

The grinding wheel 25 has an inside diameter sufficiently larger than the inside diameter of the gear blank W. The gear blank W can be vertically moved into and out of the grinding wheel 25 by the actuator 11.

A coolant recovery unit 30 is disposed around a lower portion of the workpiece support unit 4 for retrieving grinding oil for circulatory use.

Specifically, an oil pan 31 is mounted on the front side of the bed 2 in surrounding relation to the lower portion of the workpiece support unit 4. Grinding oil that has been used in machining the gear blank W is collected by the oil pan 31, and then introduced into a primary coolant filtering centrifugal separator 38 (see FIG. 3) by which the grinding oil is filtered. The grinding oil that has been filtered by the primary coolant filtering centrifugal separator 38 is then introduced into a secondary coolant filtering tank 32 by which the grinding oil is filtered again thus removing chips. The grinding oil is then used in circulatory cycles.

Heretofore, it has been customary to collect such grinding oil simply after it has flowed on the upper surface of the bed 2.

Depending on the configuration of the gear blank W, the bear blank W may have to be vertically held at its center. To this end, as shown in FIG. 3, a tail stock 34 for supporting the gear blank W from above is vertically movably mounted on a upstanding slide base 35 on the bed 2. Therefore, the gear blank W can be supported from above at its center by the tail stock 34.

Operation of the gear finishing apparatus 1 will be described below.

First, the gear blank W is set in position on the workpiece holder 7. At this time, the workpiece support unit 4 may be elevated or lowered to position a set region of the gear blank W at a height different from that of the inner circumferential surface of the grinding wheel head 23 to keep the gear blank W and the grinding wheel head 23 out of interference with each other, for facilitating attachment of the gear blank W to the workpiece holder 7.

Then, the gear blank W is adjusted in phase or indexed by the workpiece index unit 28 and the workpiece index motor 8, and thereafter vertically positioned into mesh with the grinding wheel 25. More specifically, the grinding wheel head 23 is moved forwards by the actuator 29 until those gear teeth of the grinding wheel 25 near the turn base 22 are brought into mesh with some of the gear teeth of the gear blank W.

At this time, the grinding wheel 25 has been tilted at the angle $\theta$ to the vertical axis such that the axis about which the grinding wheel W is rotatable is tilted at the angle $\theta$ to the axis through which the gear blank W is rotatable, i.e., to the vertical axis.

The grinding wheel 25 is then rotated by the motor 26 and the gear blank W is also rotated in unison therewith for thereby finishing, i.e., honing, the gear teeth of the gear blank W.

Figure 5:
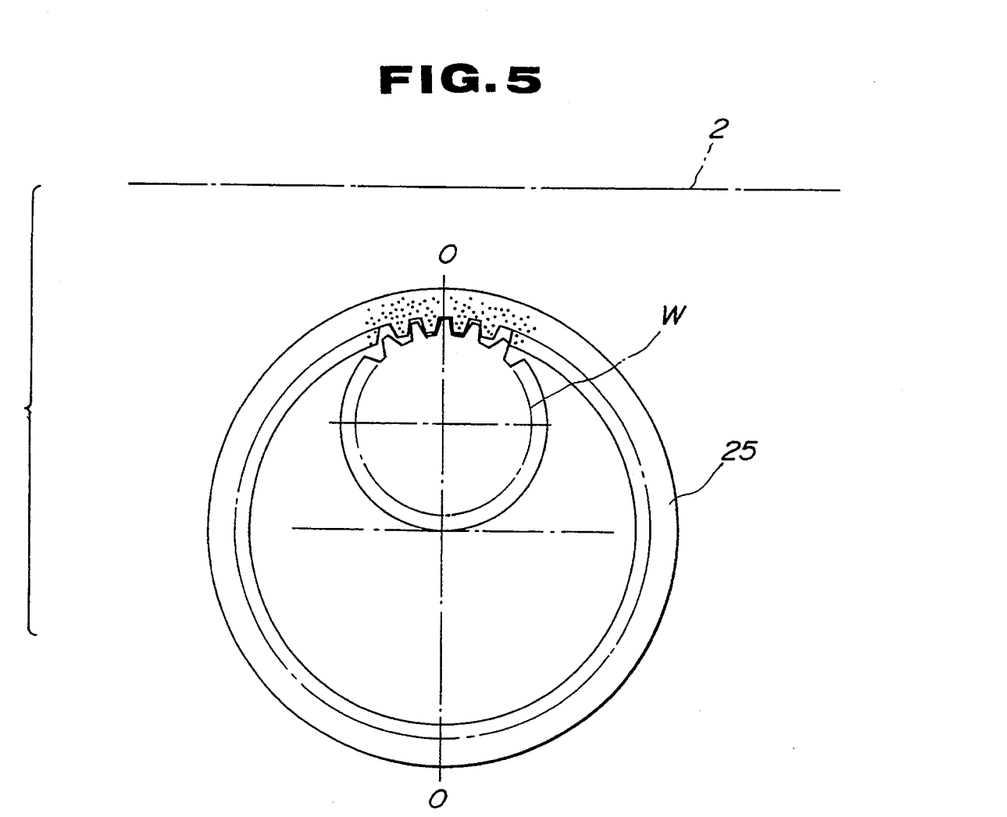
FIG. 5 is a schematic plan view showing the manner in which a grinding wheel in the form of an internal gear and a gear blank mesh with each other in the gear finishing apparatus shown in FIG. 1.
Figure 6:
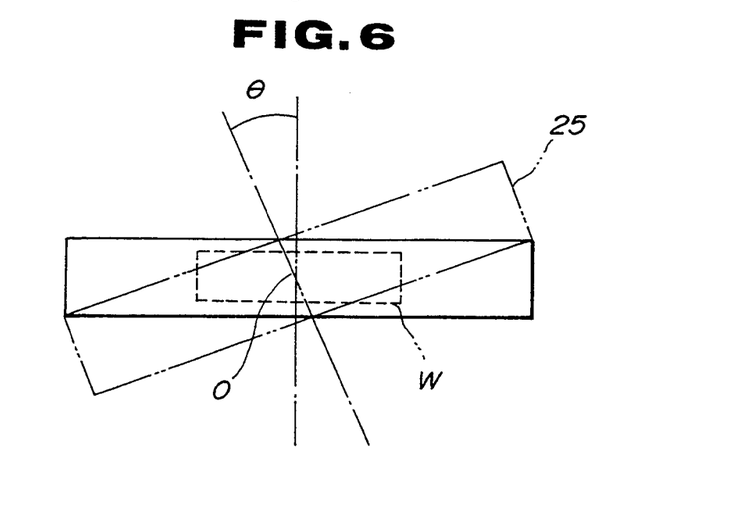
FIG. 6 is a front elevational view of the grinding wheel and the gear blank, shown in FIG. 5, that are held in mesh with each other.

Since the angle $\theta$ of the grinding wheel 25 is set by angularly moving the grinding wheel 25 about a line O—O shown in FIG. 5, it is possible to position a point where the grinding wheel 25 and the gear blank W mesh with each other most closely to the turn base 22. In particular, the meshing point between the grinding wheel 25 and the gear blank W is positioned above a plane extending horizontally from the upper surface of the bed 2 beyond the front side thereof.

Reactive forces that are produced when the gear blank W is finished and transmitted to the upper surface of the bed 2 through the grinding wheel 25 are applied through a portion of the bed 2 that extends from the turn base 22 over a distance e (the distance e is actually smaller than illustrated in FIG. 2 as the grinding wheel head 23 is actually moved forwards into mesh with the gear blank W) and a portion of the turn base 22 that extends from the sliders 17 over a distance f. Any deformation of the bed 2 which may be caused by the reactive forces from the grinding wheel 25 an be minimized by minimizing these distances e, f. Therefore, the gear finishing apparatus has a relatively high degree of rigidity against reactive forces.

Reactive forces transmitted to the front side of the bed 2 through the gear blank W are governed by a distance d from the front side of the bed 2 to the gear blank W and a distance c from the upper sliders 9 to the gear blank W. Any deformation of the front side of the bed 2 under the transmitted reactive forces is thus subject to the distances d, c. Since the distance d can be minimized from a large value corresponding to the radius of the grinding wheel 25, the rigidity of the gear finishing apparatus 1 against reactive forces is relatively high.

Stated otherwise, the bearing rigidity of the grinding wheel support unit 16 and the bearing rigidity of the workpiece support unit 4 are not required to be of a large value as is the case with the conventional honing apparatus. Consequently, the gear finishing apparatus 1 may be reduced in size and weight.

The gear finishing apparatus is also simplified in arrangement and allows easy installation of the gear blank W as the gear blank W can be supported in a cantilevered fashion.

Grinding oil that is applied to the gear blank W and the grinding wheel 25 is retrieved by the coolant recovery unit 30 through the oil pan 31, and does not affect the bed 2 in any way. The bed 2 is thus free from any deformation which would otherwise be caused thermally by grinding oil flowing thereon and hence from a resultant reduction in machining accuracy.

The finishing operation of the gear finishing apparatus 1 is controlled by a control console 36 disposed in a rear portion of the gear finishing apparatus 1.

A modification of the gear finishing apparatus 1 with the workpiece support unit 4 having a dresser will be described below with reference to FIG. 7.

Figure 7:
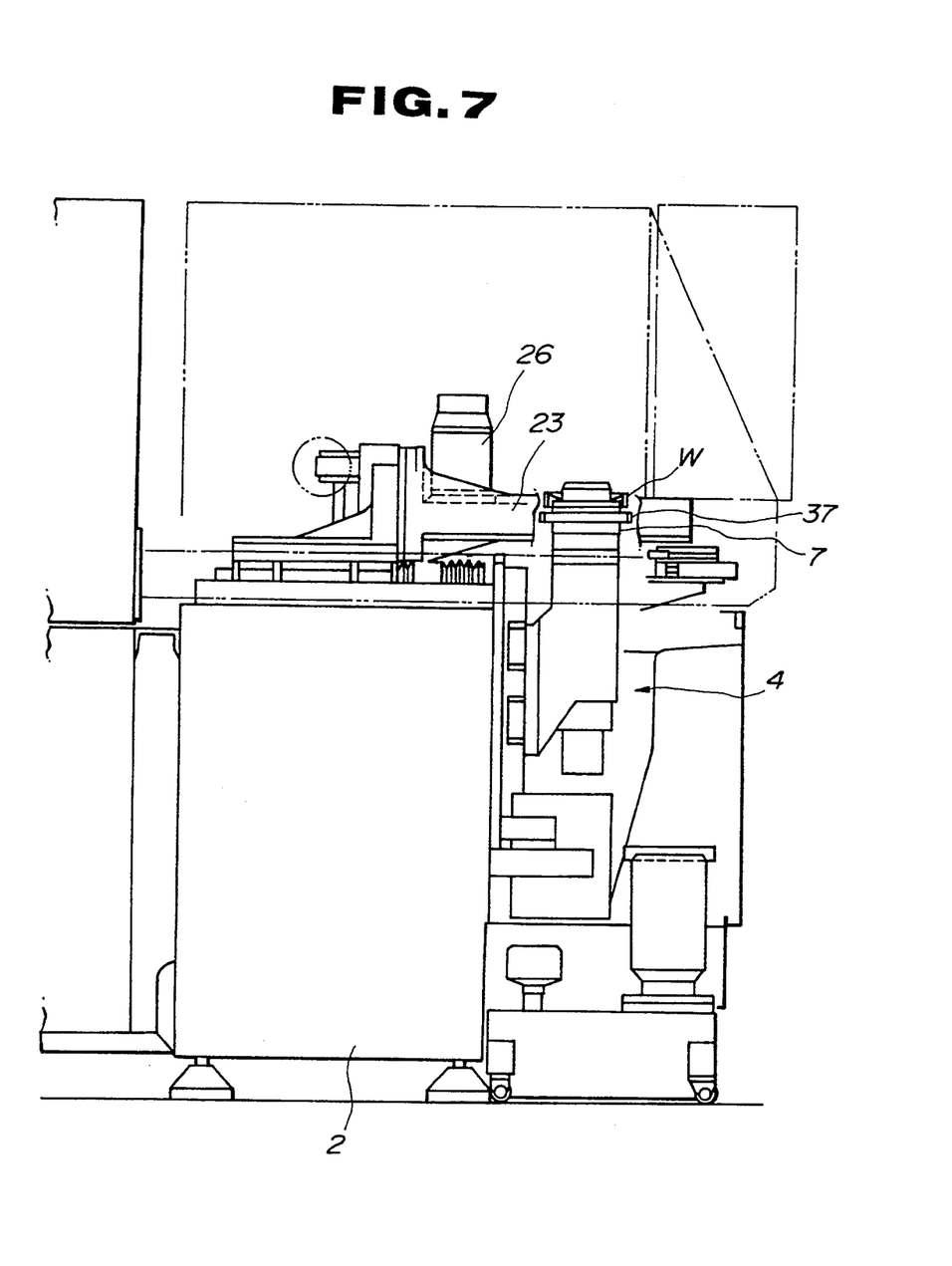
FIG. 7 is a side elevational view of the gear finishing apparatus shown in FIG. 1 which is partly modified for dressing the grinding wheel.

As shown in FIG. 7, the modified gear finishing apparatus has, on the workpiece support unit 4, a gear-shaped dresser 37 disposed underneath a workpiece setting region of the workpiece holder 7. When the grinding wheel 25 needs dressing, the dresser 37 is brought into mesh with the grinding wheel 25, and they are rotated relatively to each other to dress the grinding wheel 25.

Heretofore, it has been the customary practice to either remove the grinding wheel 25 and dress the grinding wheel 25 with a separate dresser, or dress the grinding wheel 25 with a dresser that is located in the vicinity of the gear finishing apparatus. The modified gear finishing apparatus according to the present invention allows the grinding wheel 25 to be dressed easily and simply at any desired time.

In the gear finishing apparatus 1 according to the first embodiment, the grinding wheel support unit 16 and the workpiece support unit 4 are supported respectively on the upper horizontal and front vertical surfaces of the bed 2, so that reactive forces produced when the gear blank W is finished are transmitted to the respective upper horizontal and front vertical surfaces through minimum paths on the grinding wheel support unit 16 and the workpiece support unit 4. Therefore, since the bearing rigidity for supporting the grinding wheel 25 and the gear blank W is not required to be increased, the gear finishing apparatus 1 may be relatively small in size and weight, and simplified in arrangement.

As the gear blank W can be supported in a cantilevered manner, the gear finishing apparatus 1 may be further simplified in arrangement, of a reduced cost, and allows the gear blank W to be set in place with ease.

The coolant recovery unit 30 for collecting grinding oil is positioned next to the bed 2 and directly below the region where the gear blank W is machined. Accordingly, the bed 2 is prevented from storing heat from the grinding oil and hence from thermally deformed, so that the finished gear has high machining accuracy and high machined quality.

The dresser 37 of the workpiece support unit 4 allows the grinding wheel 25 to be dressed easily.

A gear finishing apparatus 100 according to a second embodiment of the present invention will be described with reference to FIGS. 8 through 12.

The gear finishing apparatus 100 is designed to machine a gear blank W under high load by having a vertical axis about which the gear blank W is rotatable and supporting a grinding wheel head at its opposite ends.

The gear finishing apparatus 100 generally comprises a honing unit 101 (see FIG. 10) for honing the gear blank W, a chip processor 102 for processing chips, and a control console (not shown) for controlling finishing operation. The honing unit 101 has a bed 104 fixedly mounted on a floor.

The bed 104 has a vertical hole 105 (see FIGS. 9 and 10) defined centrally therein and having a rectangular opening defined in an upper surface of the bed 104. A workpiece support unit 107 is disposed generally in the hole 105, i.e., extends upwardly from within the hole 105 to a position above the rectangular opening thereof.

Figure 10:
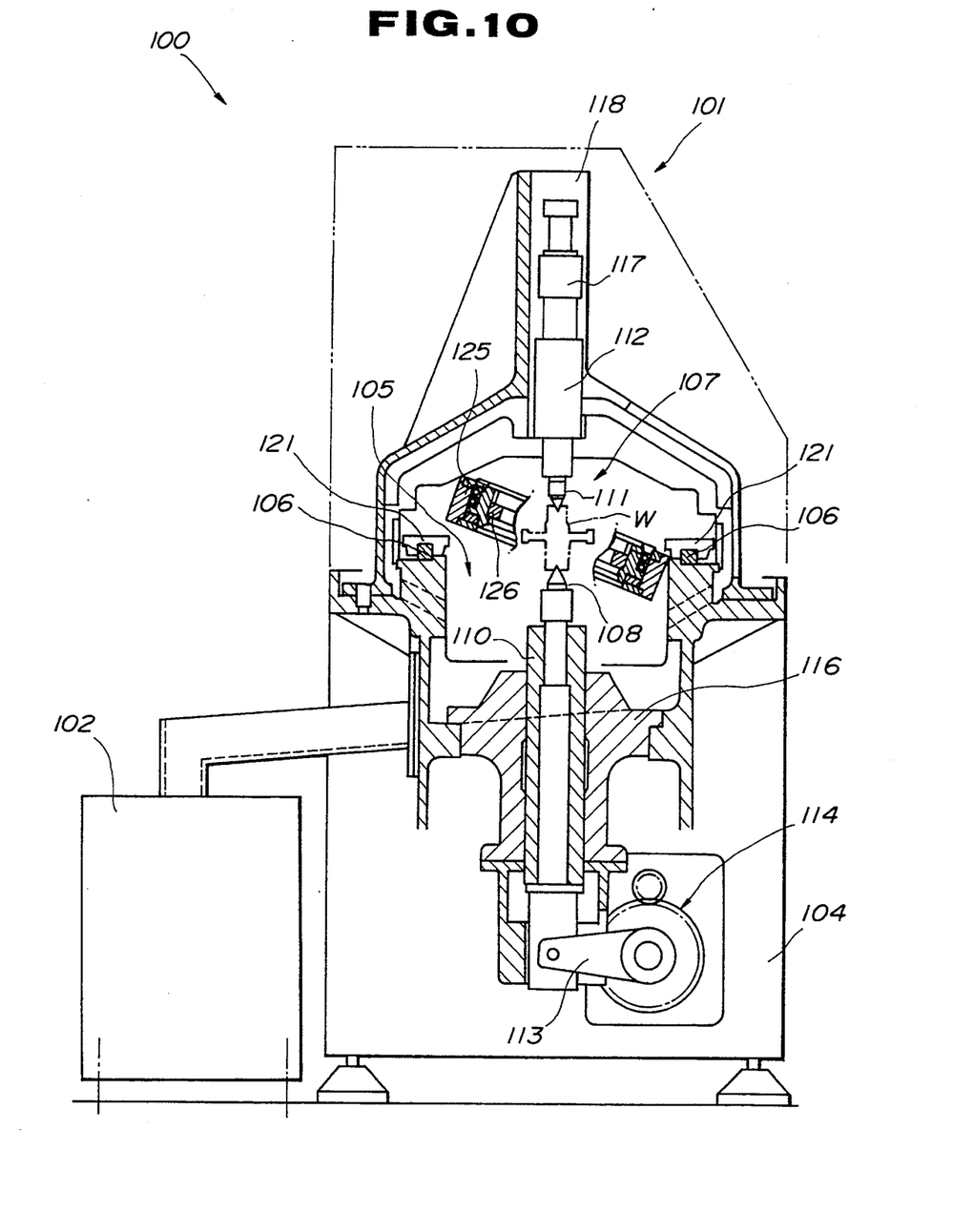
FIG. 10 is a cross-sectional view taken along line X—X of FIG. 8.

The workpiece support unit 107 comprises a pair of lower and upper workpiece support centers 108, 111 for vertically holding therebetween the gear blank W rotatably about a vertical axis, and a vertically movable quill 110 which supports the lower workpiece support center 108. The lower workpiece support center 108 supports the center of a lower surface of the gear blank W, and is mounted on an upper portion of the quill 110 for vertical movement. The upper workpiece support center 111 is attached to a lower end of a tail stock 112 for vertical movement. More specifically, as shown in FIG. 10, a vertically movable link 113 is coupled at one end to the lower end of the vertically movable quill 110, and at the other end to a motor 113 through a gear train 114 (see FIG. 9). When the motor 113 is energized, the end of the link 113 coupled to the quill 110 is vertically moved. The link 113 and the motor 115 thus serve to vertically move the lower and upper workpiece support centers 108, 110.

A holder 116 is disposed around the quill 110 for slidingly guiding the quill 110 as it is vertically moved. The holder 116 divides the vertical hole 105 into upper and lower chambers. The lower and upper workpiece support centers 108, 110 which jointly hold the gear blank W are disposed in the upper chamber of the vertical hole 105, which communicates with the chip processor 102 as shown in FIG. 10. The gear train 114 and the motor 115 are housed in the lower chamber of the vertical hole 105. Grinding oil containing chips from the upper chamber is collected by the chip processor 102, which processes the chips contained in the grinding oil that is supplied to the chip processor 102.

The tail stock 112 is coupled to a cylinder unit 117 mounted in a tail stock base 118 that projects vertically and is fixed to an upper surface of the bed 104. The tail stock 112 can thus be vertically moved when the cylinder unit 117 is actuated.

A pair of spaced horizontal guide rails 106 is mounted on the upper surface of the bed 102 one on each side of the rectangular opening of the vertical hole 105. The guide rails 106 extend along longitudinal sides, respectively, of the rectangular opening, and perpendicularly to the direction in which the quill 110 is vertically moved while being guided by the holder 116. The guide rails 106 are engaged by a grinding wheel support unit 103 for movement in the directions indicated by the arrows F, R (FIG. 8) along the guide rails 106.

The grinding wheel support unit 103 comprises a grinding wheel head support base 120 in the form of a rectangular frame, a plurality of sliders 121 mounted on a lower surface of the grinding wheel head support base 120 and slidably engaging the guide rails 106, a grinding wheel head 125 swingably coupled to the grinding wheel head support base 120, and a ring-shaped grinding wheel 126 in the form of an internal gear which is rotatably supported on the grinding wheel head 125. The grinding wheel support unit 103 can be moved back and forth along the guide rails 106 by an actuator which comprises a motor 124 fixed to a rear end of the bed 104 and a ball screw shaft 122 coupled to the output shaft of the motor 124. The ball screw shaft 122 engages in a threaded portion in a rear end of the grinding wheel head support base 120. When the ball screw shaft 122 is rotated about its own axis by the motor 124, the grinding wheel head support base 120 is moved back and forth along the guide rails 106 horizontally above the rectangular opening of the vertical hole 105.

Figure 8:
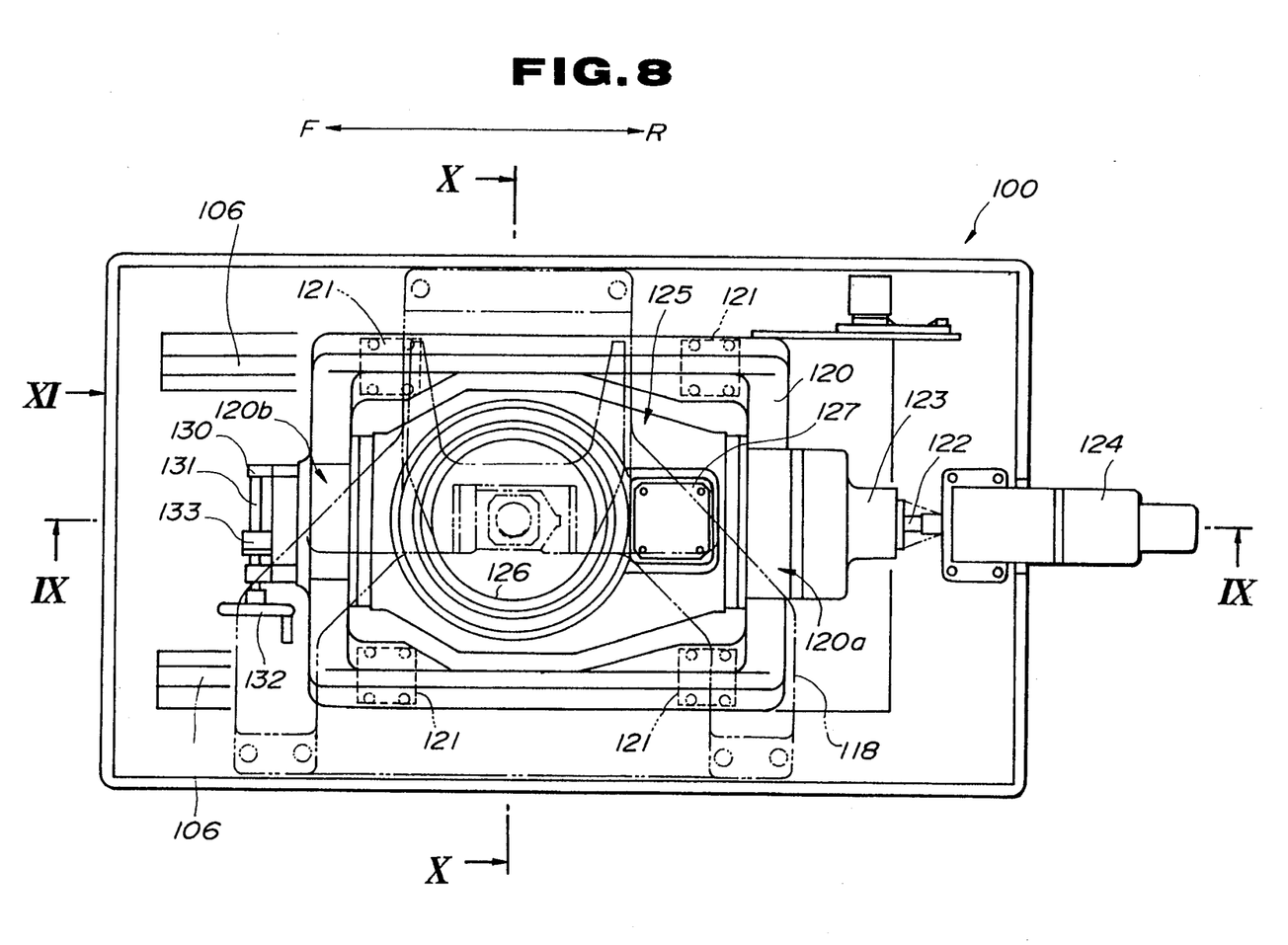
FIG. 8 is a plan view of a gear finishing apparatus according to a second embodiment of the present invention.
Figure 9:
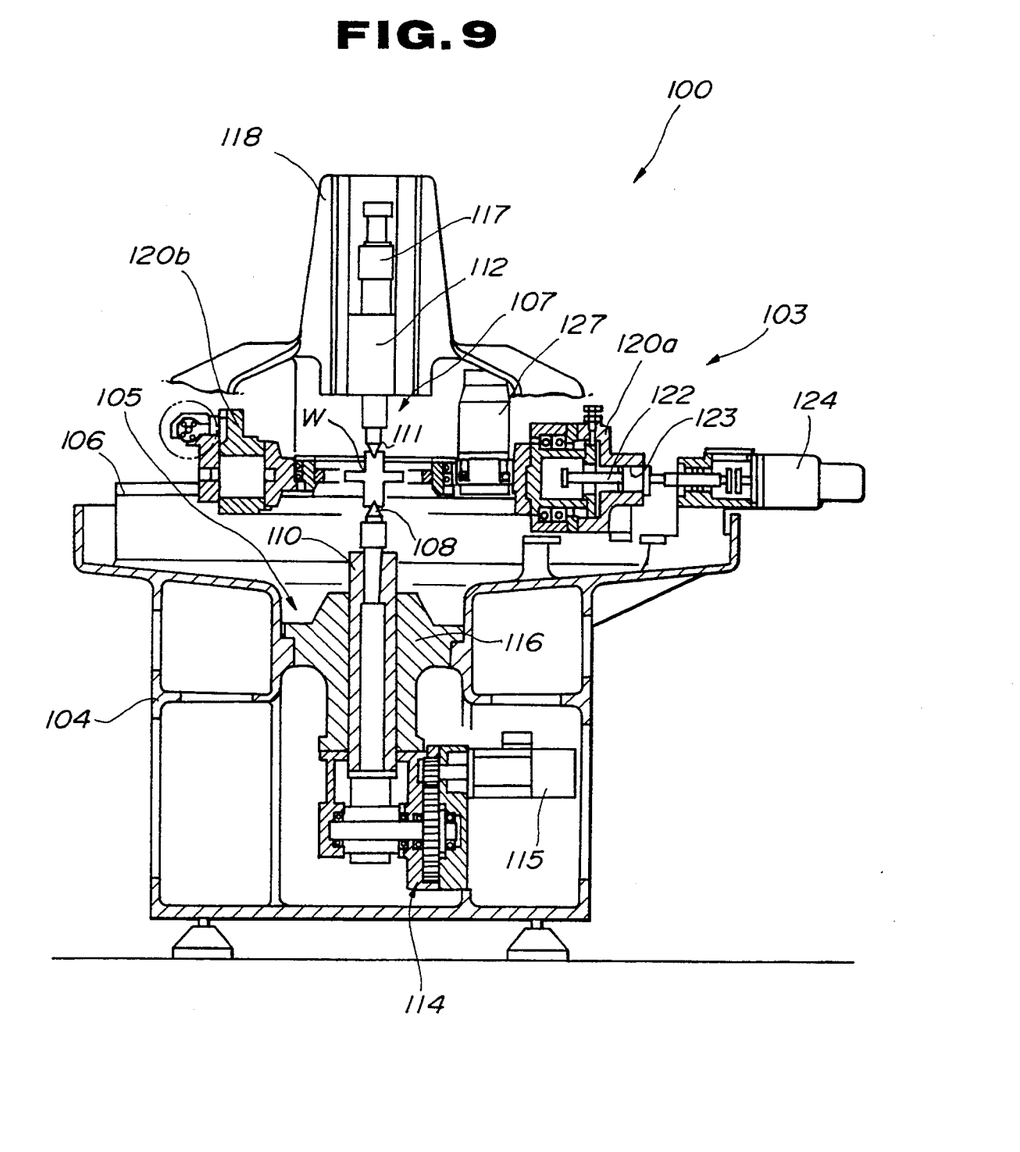
FIG. 9 is a cross-sectional view taken along line IX—IX of FIG. 8.
Figure 12:
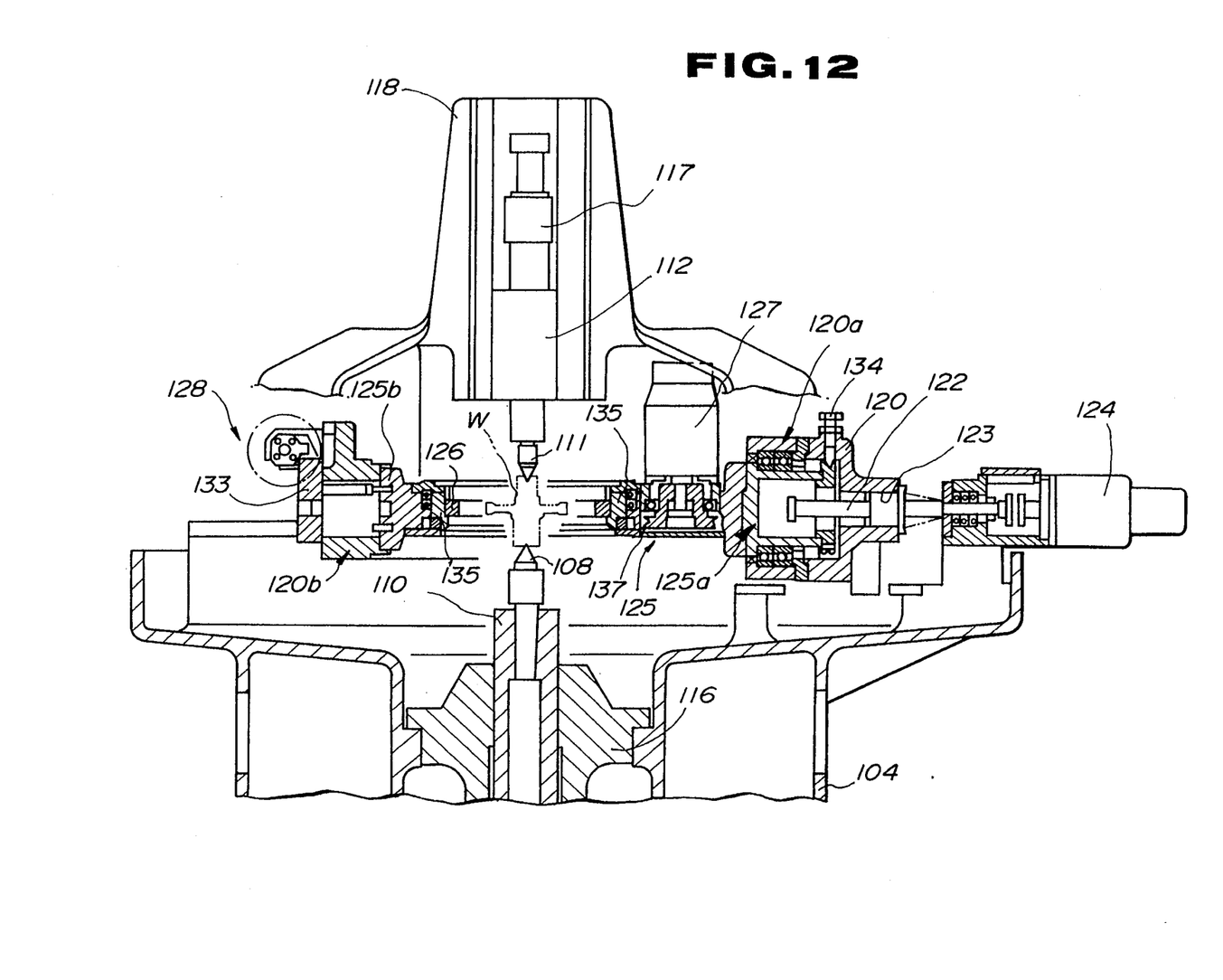
FIG. 12 is a fragmentary enlarged view of FIG. 9.

The grinding wheel head 125 is located in the frame of the grinding wheel head support base 120. The grinding wheel head 125 has an outer profile substantially complementary to the frame of the grinding wheel head support base 120, as shown in FIG. 8, and has a certain thickness in the vertical direction. As shown in FIG. 12, the grinding wheel 126 is rotatably disposed centrally in the grinding wheel head 125, which supports a motor 127 on its rear end for rotating the grinding wheel 126 about its own axis.

The grinding wheel head 125 is rotatably supported at its opposite ends on the grinding wheel head support base 120. Specifically, the grinding wheel head 1125 and the grinding wheel head support base 120 are coupled to each other at two points that are positioned on an extension of the ball screw shaft 122 and a horizontal axis about which the grinding wheel head 125 is swingable. The grinding wheel head 125 has a joint 125a on one end near the motor 127 which is rotatably supported by a bearing 120a on the grinding wheel head support base 120, and a joint 125b on the other end which is rotatably supported on a bearing 120b of the grinding wheel head support base 120. The joint 125b projects through the bearing 120b out of the frame of the grinding wheel head support base 120, and a swing arm 133 is attached to the projecting end of the joint 125b.

The joints 125a, 125b and the bearings 120a, 120b allow the grinding wheel head 125 to turn with respect to the grinding wheel head support base 120 about the horizontal axis on the extension of the ball screw shaft 122. The angle through which the grinding wheel head 125 is turned can be set by a turning angle setting mechanism 128 on one end of the grinding wheel head support base 120.

Figure 11:
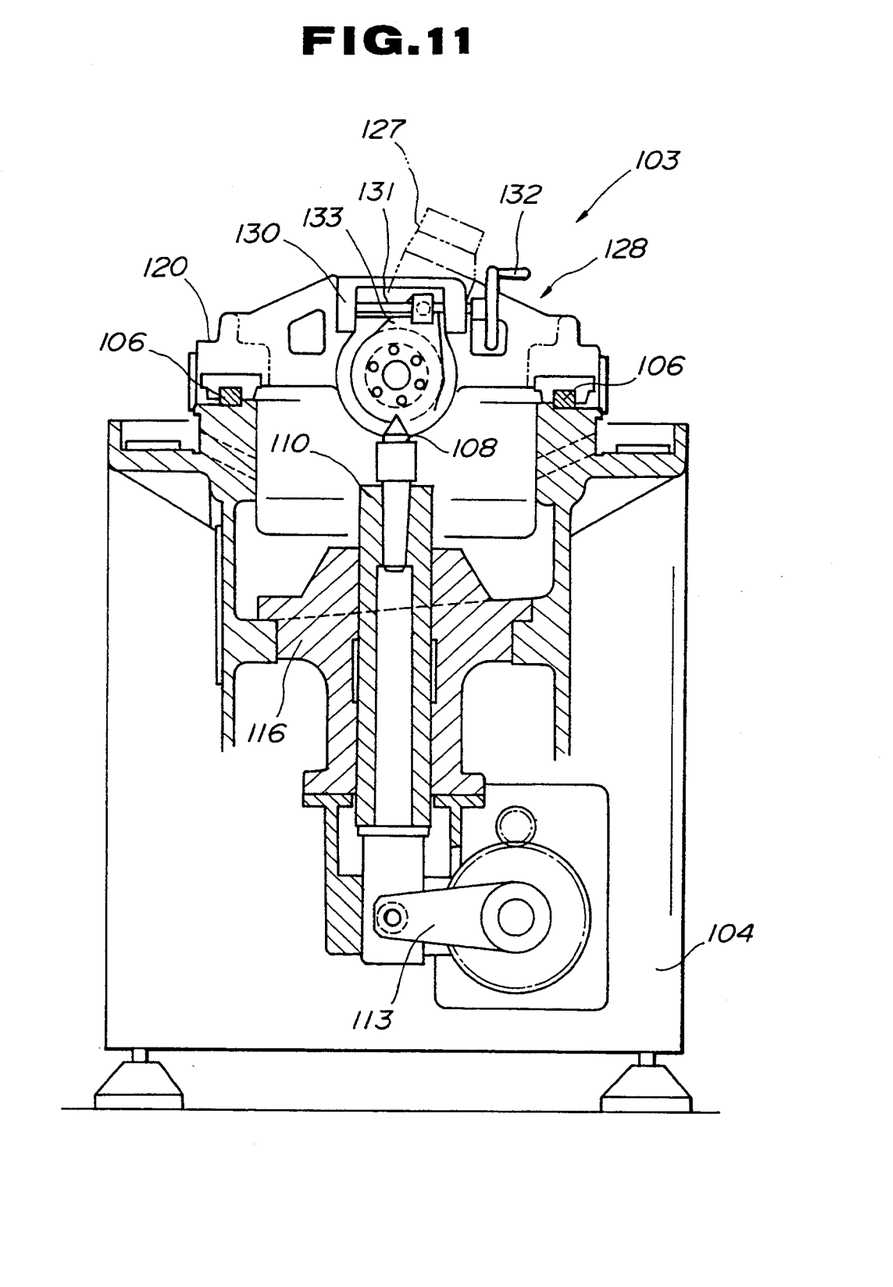
FIG. 11 is a view as viewed in the direction indicated by the arrow XI in FIG. 8.

As shown in FIG. 11, the turning angle setting mechanism 128 comprises an inverted U-shaped bearing 130 projecting outwardly from the grinding wheel head support base 120, a screw shaft 131 rotatably supported on the bearing 130, and an operating handle 132 connected to the screw shaft 131. The swing arm 133 has a radially outer end threaded over the screw shaft 131.

When the operating handle 132 is manually turned, the screw shaft 131 is rotated about its own axis, causing the swing arm 133 to swing thereby to turn the grinding wheel head 125 through a desired angle. A stopper 134 shown in FIG. 12 is attached to the grinding wheel head support base 120 near the bearing 120a for stopping the grinding wheel head 125 in a desired angular position after the grinding wheel head 125 has been turned.

The grinding wheel 126 can be rotated by a rotating mechanism as follows: The grinding wheel 126 has internal gear teeth and is supported on a larger-diameter annular grinding wheel holder 135 as shown in FIG. 12. The grinding wheel holder 135 is rotatably mounted on the grinding wheel head 125 by a bearing. A belt pulley 137 is attached to the lower end of the output shaft of the motor 127, and a belt (not shown) is trained around the belt pulley 137 and the grinding wheel holder 135. When the motor 127 is energized, therefore, the grinding wheel holder 135 and hence the grinding wheel 136 are rotated.

Honing operation of the gear finishing apparatus 100 will be described below.

A gear blank W with gear teeth is set in place on the workpiece support unit 107. Specifically, the gear blank W is first gripped between the lower and upper workpiece support centers 108, 111 with the axis about which the gear blank W is rotatable being vertical, and then positioned in the vertical direction.

At this time, the grinding wheel head support base 120 is positioned out of the way of the gear blank W as it is installed in place, e.g., the gear blank W is positioned centrally in the grinding wheel 126. If necessary, the grinding wheel 125 has been angularly displaced through a certain angle as shown in FIG. 10.

After the gear blank W is positioned, the motor 124 is energized to move the grinding wheel head support base 120 horizontally in one direction until some internal gear teeth of the grinding wheel 126 are brought into mesh with some gear teeth of the gear blank W over the rectangular opening of the vertical hole 105.

While applying grinding oil to the intermeshing gear teeth, the motor 127 is energized to rotate the grinding wheel 126 to hone the gear teeth of the gear blank W that rotates relatively to the grinding wheel 126. During this time, the quill 110 is vertically moved up and down by the motor 115 for thereby finishing the entire surfaces of the gear teeth accurately while the grinding wheel 126 and the gear blank W are being rotated in mesh with each other.

The grinding oil containing chips drops into the vertical hole 105, and is discharged from the upper chamber thereof into the chip processor 102.

While the gear blank W is being finished, the grinding wheel head 125 is supported at its opposite ends on the grinding wheel head support base 120. Therefore, the bearing rigidity for bearing the grinding wheel 126 is relatively high, allowing the gear blank W to be machined highly accurately.

The grinding oil which is heated flows into the vertical hole 105 and is drained into the chip processor 102. Inasmuch as the discharged grinding oil does not adversely affect the bed 104, particularly its upper surface, the bed 104 does not cause a reduction in the machining accuracy due to thermally induced deformation which would otherwise occur.

Even if the grinding wheel 126 and the gear blank W are held in mesh with each other under high load, the machining accuracy is now lowered. Thus, the processing efficiency of the gear finishing apparatus 100 is increased for higher productivity.

Since the grinding wheel head 125 is supported at its opposite ends, the arrangement for maintaining a desired degree of rigidity may be partly dispensed with, rendering gear finishing apparatus more compact.

In the gear finishing apparatus 100 according to the second embodiment, as described above, the axis about which the gear blank W is rotatable is held vertically, and the grinding wheel head 125 for machining the gear blank W is supported at its opposite ends. As a consequence, the grinding wheel 126 is kept at a stable attitude for higher machining accuracy. The heated grinding oil which flows into the vertical hole 105 does not thermally affect the bed 104, i.e., no thermal energy is stored in the bed 104 by the grinding oil. Therefore, the bed 104 is prevented from being thermally deformed and hence is free from any responsibility for a reduction in the machining accuracy. Furthermore, supporting the grinding wheel head 125 at its opposite ends makes it possible to reduce the size of the gear finishing apparatus 100 as the arrangement for maintaining a desired degree of rigidity may be partly dispensed with.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

What is claimed is:

1. A gear finishing apparatus comprising:
   a bed having a horizontally extending guide member and a vertically extending guide member;
   a grinding wheel support unit movable along said horizontally extending guide member and having a grinding wheel head;
   a ring-shaped grinding wheel in the form of an internal gear rotatably supported on said grinding wheel head for rotation about a substantially vertical axis;
   said grinding wheel support unit including turning means for turning said grinding wheel head about a horizontal axis and securing the grinding wheel head after it has been turned in order to tilt said grinding wheel at a predetermined angle;
   first actuating means for moving said grinding wheel support unit along said horizontally extending guide member;
   a workpiece support unit movable along said vertically extending guide member, said workpiece support unit having holding means for holding a gear blank having external gear teeth for rotation about a substantially vertical axis;
   second actuating means for moving said workpiece support unit along said vertically extending guide member to move said gear blank into and out of said grinding wheel; and
   third actuating means for rotating said grinding wheel to hone the gear teeth of said gear blank while the gear blank is being positioned in said grinding wheel held by said holding means, and said grinding wheel and said gear blank are being held in mesh with each other by said first actuating means and said second actuating means.

2. A gear finishing apparatus according to claim 1, wherein said bed comprises a rectangular parallelepiped having an upper surface on which said horizontally extending guide member is mounted and a side surface on which said vertically extending guide member is mounted, said horizontally and vertically extending guide members extending perpendicularly to each other.

3. A gear finishing apparatus according to claim 2, wherein said turning means comprises at least a turn base, said grinding wheel head is angularly movably supported on said turn base in a cantilevered fashion and projects forwards from said turn base.

4. A gear finishing apparatus according to claim 3, wherein said gear blank meshes with those gear teeth of said grinding wheel which are positioned near said turn 4 base while the gear teeth of said gear blank are honed by said grinding wheel.

5. A gear finishing apparatus according to claim 4, wherein said gear blank and said grinding wheel mesh with each other at a meshing point which is positioned on a forward extension of said upper surface of said bed beyond said side surface thereof.

6. A gear finishing apparatus according to claim 5, further comprising an oil pan disposed around a lower portion of said workpiece support unit for collecting grinding oil applied to the meshing gear teeth and a coolant recovery unit for retrieving the grinding oil from said oil pan for circulatory use.

7. A gear finishing apparatus according to claim 1, further comprising holder means for holding said gear blank from above in alignment with said substantially vertical axis about which the bear blank is rotatable.

8. A gear finishing apparatus according to claim 1, wherein said workpiece support unit further includes a gear-shaped dresser disposed below said holing means for dressing said grinding wheel after said dresser is brought into mesh with the grinding wheel by said second actuating means.

9. A gear finishing apparatus according to claim 1, wherein said bed comprises an upper surface on which said horizontally extending guide member is mounted, and has a vertical hole in which said vertically extending guide member is disposed.

10. A gear finishing apparatus according to claim 9, wherein said holding means comprises lower and upper workpiece support centers for supporting said gear blank from below and above, respectively, in alignment with said substantially vertical axis about which the bear blank is rotatable.

11. A gear finishing apparatus according to claim 10, wherein said workpiece support unit further includes a vertically movable quill disposed in said vertical hole and vertically movable by said second actuating means, said lower workpiece support center being mounted on an upper portion of said vertically movable quill, said vertically extending guide member comprising a holder disposed in said vertical hole, said vertically movable quill being slidably supported by said holder.

12. A gear finishing apparatus according to claim 11, wherein said grinding wheel head being supported at two points on an extension of said horizontal axis about which said grinding wheel head can be turned by said turning means.

13. A gear finishing apparatus according to claim 11, wherein said grinding wheel meshes with said gear blank over an opening of said vertical hole at said upper surface of said bed for honing the gear teeth of said gear blank.

14. A gear finishing apparatus according to claim 13, further comprising chip processing means for processing grinding oil applied to the gear teeth of said gear blank when they are honed, said vertical hole being divided by said holder into an upper chamber in which said gear blank is held by said holding means, and a lower chamber in which said second actuating means is disposed, said upper chamber communicating with said chip processor for discharging said grinding oil into said chip processor.

* * * * *